US012174015B2

(12) United States Patent
Bongs et al.

(10) Patent No.: US 12,174,015 B2
(45) Date of Patent: Dec. 24, 2024

(54) FREQUENCY CONTROL OF ORTHOGONAL POLARISATION MODES IN AN OPTICAL CAVITY

(71) Applicant: The University of Birmingham, Birmingham (GB)

(72) Inventors: Kai Bongs, Wells (GB); Michael Holynski, Nuneaton (GB); Rustin Nourshargh, Kidlington (GB)

(73) Assignee: The University of Birmingham, Birmingham (GB)

( * ) Notice: Subject to any disclaimer, the term of this patent is extended or adjusted under 35 U.S.C. 154(b) by 133 days.

(21) Appl. No.: 18/019,573

(22) PCT Filed: Jul. 19, 2021

(86) PCT No.: PCT/GB2021/051841
§ 371 (c)(1),
(2) Date: Feb. 3, 2023

(87) PCT Pub. No.: WO2022/029404
PCT Pub. Date: Feb. 10, 2022

(65) Prior Publication Data
US 2023/0288183 A1   Sep. 14, 2023

(30) Foreign Application Priority Data
Aug. 3, 2020   (GB) ...................................... 2012043

(51) Int. Cl.
*G01B 9/02002* (2022.01)
*G01B 9/02001* (2022.01)
(Continued)

(52) U.S. Cl.
CPC ..... *G01B 9/02005* (2013.01); *G01B 9/02014* (2013.01); *G02F 1/0327* (2013.01);
(Continued)

(58) Field of Classification Search
CPC ............ G01B 9/02005; G01B 9/02014; G01B 2290/55; G01B 9/00; G01B 9/02007; G02F 1/0327; G02F 1/217; G01C 19/62
See application file for complete search history.

(56) References Cited

U.S. PATENT DOCUMENTS

2010/0053633 A1   3/2010   Jansen
2014/0190254 A1   7/2014   Bouyer
(Continued)

FOREIGN PATENT DOCUMENTS

| CN | 108592783 A | 9/2018 |
| CN | 110854659 A | 2/2020 |
| WO | 2019116047 A1 | 6/2019 |

OTHER PUBLICATIONS

Cadoret, Malo, et al. "Atom interferometry based on light pulses: Application to the high precision measurement of the ratio h/m and the determination of the fine structure constant." The European Physical Journal Special Topics 172.1 (2009): 121-136.
(Continued)

*Primary Examiner* — Jonathan M Hansen
(74) *Attorney, Agent, or Firm* — Blueshift IP; Robert Plotkin

(57) ABSTRACT

The application discloses an atom interferometer comprising an optical cavity and method of operation thereof. The atom interferometer includes a vacuum chamber, an optical cavity, a source for providing a cloud of atoms in the optical cavity in use, and one or more light sources. The one or more light sources are for generating, in the cavity, in use a first light beam having a first polarisation and at a first frequency for a two-photon interaction in the atoms; and a counter-propagating second light beam having a second polarisation orthogonal to the first polarisation and at a second frequency for the two-photon interaction in the atoms. The atom interferometer also includes an electro-optic element
(Continued)

arranged in the cavity to be operable to simultaneously change; the resonant frequency of the cavity for light in the first polarisation to track changes in the frequency of the first light beam to compensate for the doppler shift of the falling atoms in use; and the resonant frequency of the cavity for light in the second polarisation to track changes in frequency of the counterpropagating second light beam to compensate for the doppler shift of the falling atoms in use.

25 Claims, 6 Drawing Sheets

(51) Int. Cl.
    *G02F 1/03*       (2006.01)
    *G02F 1/21*       (2006.01)
    *G01C 19/62*    (2006.01)
    *G01V 7/00*     (2006.01)

(52) U.S. Cl.
    CPC .............. *G02F 1/217* (2021.01); *G01C 19/62* (2013.01); *G01V 7/005* (2013.01)

(56) References Cited

U.S. PATENT DOCUMENTS

| | | | |
|---|---|---|---|
| 2014/0375998 A1* | 12/2014 | Kasevich | G01B 9/02001 356/450 |
| 2018/0267479 A1* | 9/2018 | Kotru | G04F 5/14 |
| 2021/0319925 A1* | 10/2021 | Cheiney | G01P 15/093 |

OTHER PUBLICATIONS

Canadian Office Action issued in App. No. CA3188327, dated Apr. 3, 2024, 6 pages.

Jaffe, Matthew, "Atom interferometry in an optical cavity", UC Berkeley Electronic Theses and Dissertations, pp. 1-229, Dec. 31, 2018 (Dec. 31, 2018), retrieved from https://escholarship.org/uc/item/2jn6v45z on Mar. 28, 2024 (Mar. 28, 2024).

Lu, Mei-Ju, "Light storage and retrieval with nuclear spin and a study of anisotropic inelastic collisions", University of Nevada, Reno, Theses and Dissertations, pp. 1-212, May 31, 2011 (May 31, 2011), retrieved from http://hdl.handle.net/11714/3799 on Mar. 28, 2024 (Mar. 28, 2024).

Combined Search and Examination Report mailed Feb. 3, 2021, by the Intellectual Property Office in Great Britain patent application No. GB2012043.2, 7 pages.

International Search Report & Written Opinion mailed Oct. 18, 2021, by the European Patent Office as the International Search Authority in patent application No. PCT/GB2021/051841, 10 pages.

Paul Hamilton et al., "Atom Interferometry in an Optical Cavity," Physical Review Letters, vol. 114, No. 10, Mar. 1, 2015, 6 pages, XP055376864, ISSN: 0031-9007, DOI: 10.1103/PhysRevLett.114.100405.

J. Le Gouet et al., "Wide bandwidth phase-locked diode laser with an intra-cavity electro-optic modulator," Optics Communications, Elsevier, Amsterdam, NL, vol. 282, No. 5, Mar. 1, 2009, pp. 977-980, XP025883171, ISSN: 0030-4018, DOI: 10.1016/J.OPTCOM.2008.11.055.

Akash V. Rakholia et al., "Dual-Axis High-Data-Rate Atom Interferometer via Cold Ensemble Exchange," Physical Review Applied, vol. 2, No. 5, Nov. 1, 2014, 8 pages, XP055534185, DOI: 10.1103/PhysRevApplied.2.054012.

\* cited by examiner

FREQUENCY CONTROL OF ORTHOGONAL POLARISATION MODES IN AN OPTICAL CAVITY

TECHNICAL FIELD

The present disclosure relates to atom interferometry and particularly, but not exclusively, to a device and method for providing frequency control of orthogonal polarisation modes in an optical cavity in an atom interferometer. Aspects of the invention relate to a device and a method.

BACKGROUND

Atom interferometry is a technique used for sensing and making precise measurements of physical phenomena. For example, atom interferometry may be used to accurately measure gravitational acceleration, the gravitational constant, the fine structure constant, and inertial effects such as rotations and accelerations, among other physical phenomena.

Atom interferometers use lasers to interact with states of atoms typically through Bragg or Raman transitions to transfer momentum to the atoms to generate two or more split matter wave beams of atoms along different pathways. The separate matter wave beams are later redirected and interfered together, and the resulting interference pattern may be analysed to determine the physical phenomena. Travelling from the initial interaction to the point of interference and observation, the atoms are in quantum superposition. Unlike light, atoms are massive and bear signals from gravitation and other interactions in their interference patterns, and allow highly sensitive measurements of these phenomena to be performed. Indeed, any effect that modifies the potential energy, internal energy, or kinetic energy across the two arms of the interferometer may, depending on the configuration of the interferometer, appear in the interference pattern. For example, by looking at population differences in the atoms in the states shown in the interference patterns, the effect the phenomenon has had on the atoms in the two arms of the interferometer can be revealed.

However, currently atom interferometers are typically large and require powerful lasers to operate, which limits the potential applications for atom interferometry outside a laboratory.

It is in the above context that the present invention has been devised.

SUMMARY OF THE INVENTION

Aspects and embodiments of the invention provide a device and method as claimed in the appended claims.

According to an aspect of the present disclosure, there is provided an atom interferometer comprising a vacuum chamber, an optical cavity, a source for providing a cloud of atoms, one or more light sources and an electro-optic element arranged in the cavity. In use, the light sources generate a first light beam having a first polarisation, and at a first frequency for a two-photon interaction in the atoms. The light sources also generate a counterpropagating second light beam having a second polarisation orthogonal to the first polarisation and at a second frequency for the two-photon interaction in the atoms. The electro-optic element is operable to simultaneously change: the resonant frequency of the cavity for light in the first polarisation to track changes in the frequency of the first light beam; and the resonant frequency of the cavity for light in the second polarisation to track changes in frequency of the counterpropagating second light beam. In embodiments, the electro-optic element is operable to simultaneously change the resonant frequency of the cavity for light in the first and second polarisations to track changes in the frequency of the first and second light beams to compensate for the doppler shift of the falling atoms in use.

According to another aspect of the present disclosure, there is provided a method for operating an atom interferometer as described herein. The method comprises cooling an atom cloud in the optical cavity and allowing the cooled atoms to freefall in the cavity. The method further comprises illuminating the falling atoms using pulses of first and second counterpropagating light beams to stimulate falling atoms into a superposition of quantum states through the two-photon interactions, adjusting the frequency of the first and second counterpropagating light beams, and applying a voltage to the electro-optic element to the electro-optic element to differentially adjust the optical path length of the cavity for the two counterpropagating light beams simultaneously so that the cavity remains on resonance for both light beams as the frequency of the light beams is changed. In embodiments, the method further comprises adjusting the frequency of the first and second counterpropagating light beams comprises adjusting simultaneously the frequency of the first and second counterpropagating light beams to compensate for the doppler shift of the light as the atoms fall in the cavity.

Advantageously, this allows the resonant longitudinal modes of two orthogonally polarised laser beams within an optical cavity to be arbitrarily controlled over short time scales of less than one second. The resonant frequencies can be adjusted in real time. The relative frequencies of the two laser beams can be adjusted arbitrarily over microsecond or millisecond time scales and the overall frequencies of each laser beam can be adjusted deterministically over millisecond time scales. The deterministic adjustment is required for interferometry applications.

Furthermore, the adjustments do not rely on an optic being manually adjusted, which shortens the time scales over which the frequencies can be adjusted and allows for more precise adjusting of the laser beam frequencies.

Further advantageously, the resonant mode frequencies of the two polarisations can be adjusted deterministically in real time, which allows the mode frequency to be scanned continuously at a rate which compensates for the Doppler shift during freefall of the atoms. The mode frequency can be scanned continuously at a rate which exactly compensates for the Doppler shift.

Further advantageously, the cavity resonances can be tuned to follow the changing light beam frequencies to effectively compensate for the Doppler shift without bringing the laser frequencies off resonance with the cavity.

Further advantageously, when the optical cavity is a birefringent cavity, the cavity modes may each be tuned individually.

Further advantageously, by keeping the cavity on resonance for both light beams, it is possible to use a high finesse cavity and longer experiment times without reducing the performance and sensitivity of the atom interferometer.

In embodiments, the vacuum chamber is located inside the optical cavity.

Advantageously, this allows a smaller volume to be evacuated than when the optical cavity is located inside the vacuum chamber. It is therefore possible to use a less powerful vacuum pump to effectively evacuate the vacuum chamber. Moreover, it may take less time to evacuate the vacuum chamber. Further, by placing the optical cavity outside the vacuum chamber, with the chamber in the optical path inside the cavity, the cavity is easier to build and align outside of vacuum and long term stability of the cavity is less of an issue as drift and creep can be addressed.

In embodiments, the optical cavity is located inside the vacuum chamber.

Advantageously, this ensures that the entire optical cavity is under the same pressure. By placing the cavity under vacuum, noise and phase front aberrations caused by passing through air and the vacuum chamber windows are removed. This arrangement also reduces power losses caused by scatter, reflection and absorption from the windows.

In embodiments, the electro-optic element is arranged to differentially change a refractive index in the element for the first light beam and the second light beam in response to an electric field applied across the element.

Advantageously, changing the refractive index in the element for each light beam differentially allows better control of both the individual frequencies and the relative frequencies of the light beams.

In embodiments, the electro-optic element is a Pockels cell, in which the change in refractive index change is proportional to the change in the applied electric field.

Advantageously, Pockel cells have very fast response times, so the relative resonant frequencies of the cavity can be changed in time scales of the order of microseconds.

Advantageously, an intra-cavity Pockels cell allows the cavity resonances to shift in frequency to compensate for the Doppler effect observed in the freefalling atoms of the atom interferometer.

Advantageously, the refractive index change being proportional to the change in applied electric field allows the refractive index change to be more easily measurable and controllable.

In embodiments, the electro-optic element is aligned in the optical cavity to change the refractive index for the first light beam in the element independently and differentially of the refractive index for the first second light beam in the element.

Advantageously, this provides better and arbitrary control of both the individual frequencies of each light beam and the relative frequencies of the light beams.

In embodiments, the atom interferometer further comprises a controller configured to be operable to change the frequency of the first and second counterpropagating light beams to compensate for the Doppler shift of the frequency of the light, as observed by the atoms, as their velocity changes in the cavity to maintain the two-photon interaction in use.

Advantageously, compensating for the Doppler shift in the frequency of the light enables more accurate and sensitive measurements to be taken using the atom interferometer, reducing uncertainty in the measurements.

In embodiments, the atom interferometer further comprises a controller configured to be operable to change the optical path length of the cavity for the first and second counterpropagating light beams to maintain the changed frequencies of both the first and second counterpropagating light beams on resonance in the cavity.

Advantageously, changing the optical path length of the cavity for the counterpropagating light beams ensures that the laser frequencies remain on resonance with the cavity, which effectively compensates for the Doppler shift.

In embodiments, the controller is configured to cause the electro-optic element to change the resonant frequency of the cavity for the first and second counterpropagating, orthogonally polarised light beams in opposite directions.

In embodiments, there is provided a controller for controlling a voltage source to generate an electric field in the electro-optic element to change the refractive index therein.

Advantageously, this provides a convenient and simple means for changing the refractive index of the electro-optic element, which in turn allows the relative frequencies of the light beams to be more easily controllable.

In embodiments, the controller for controlling a voltage source is configured to apply a linear ramp to the voltage applied to the electro-optic element.

Advantageously, this applies a linear change to the applied electric field across the electro-optic element, which in turn applies a linear refractive index change in the electro-optic element. This allows the refractive index change to be easily and deterministically controllable.

In embodiments, there is further provided a control apparatus to control the one or more light sources to pulse the first and second light beams to generate atom momentum recoils from the two-photon interactions to sequentially split, redirect and interfere matter waves to perform atom interferometry in use.

Advantageously, this provides an atom interferometer whose operation is more controllable.

In embodiments, the atom interferometer is arranged to be useable to measure one or more of gravitational acceleration, gravity gradients, accelerations, rotations, fundamental constants, gravitational constant or the fine structure constant.

In embodiments, the cavity has a finesse of at least 50. In embodiments, the cavity has a finesse of at least 75. In embodiments, the cavity has a finesse of at least 100. In embodiments, the cavity has a finesse of at least 125. In embodiments, the cavity has a finesse of at least 150. In embodiments, the cavity has a finesse of at least 500. In embodiments, the cavity has a finesse of at least 500.

Advantageously, the higher finesse of the cavity that is usable in the present invention enables more precise measurements to be made using atom interferometry.

In embodiments, the one or more light sources are configured to generate light in the first and second light beams at frequencies needed to stimulate Raman or Bragg transitions for the atoms.

In embodiments, the atom interferometer further comprises a magneto-optic apparatus for generating a magneto-optic trap or optical lattice for cooling the atoms in the optical cavity.

Advantageously, this provides a means for cooling the atoms in the optical cavity. Cooled atoms are able to behave like coherent waves with a wavelength determined by the momentum of the atoms. The magneto-optic apparatus enables atom temperatures of the order of microkelvins to be obtained.

In embodiments, the atom interferometer further comprises a piezoelectric transducer arranged to move a mirror of the optical cavity to adjust the optical path length of the cavity.

Advantageously, the piezoelectric transducer varies the cavity length by one wavelength of light, which moves the resonant frequencies of both cavity modes by the same amount in the same direction. This frequency shift may happen on a timescale of the order of milliseconds.

Further advantageously, the combination of varying the cavity length and adjusting the relative frequencies of the cavity modes allows arbitrary control of the resonant frequencies of the two orthogonal modes circulating in the optical cavity.

In embodiments, the length of the optical cavity is greater than 80 cm. In embodiments, the length of the optical cavity is greater than 100 cm. In embodiments, the length of the optical cavity is greater than 120 cm.

Advantageously, the use of the electro-optic element allows the length of the cavity to be longer, enabling operation and sensitivity over longer time periods, giving increased phase and therefore less overall uncertainty due to greater populations of the atoms arriving in the different end states.

In embodiments, the power of the first and second light beams is less than 500 mW. In embodiments, the power of the first and second light beams is less than 250 mW. In embodiments, the power of the first and second light beams is less than 100 mW. In embodiments, the power of the first and second light beams is less than 10 mW. In embodiments, the power of the first and second light beams is less than 1 mW. In embodiments, the power of the first and second light beams is less than 100 µW. In embodiments, the power of the first and second light beams is less than 80 µW.

Advantageously, these relatively small light beam powers increase the range of possible applications for atom interferometry outside a laboratory.

In embodiments, each light source is a diode lasers.

In embodiments, the method further comprises controlling one or more light sources to pulse the first and second light beams to generate atom momentum recoils from the two-photon interactions to sequentially split, redirect and interfere matter waves to perform atom interferometry.

In embodiments, the method further comprises adjusting the frequency of the first and second counterpropagating light beams and applying a voltage to the electro-optic element to compensate for the doppler shift of the light as the atoms fall in the cavity for a period of at least 55 ms.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

Throughout the description and the drawings, like reference numerals refer to like parts.

DETAILED DESCRIPTION

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Figure 1:
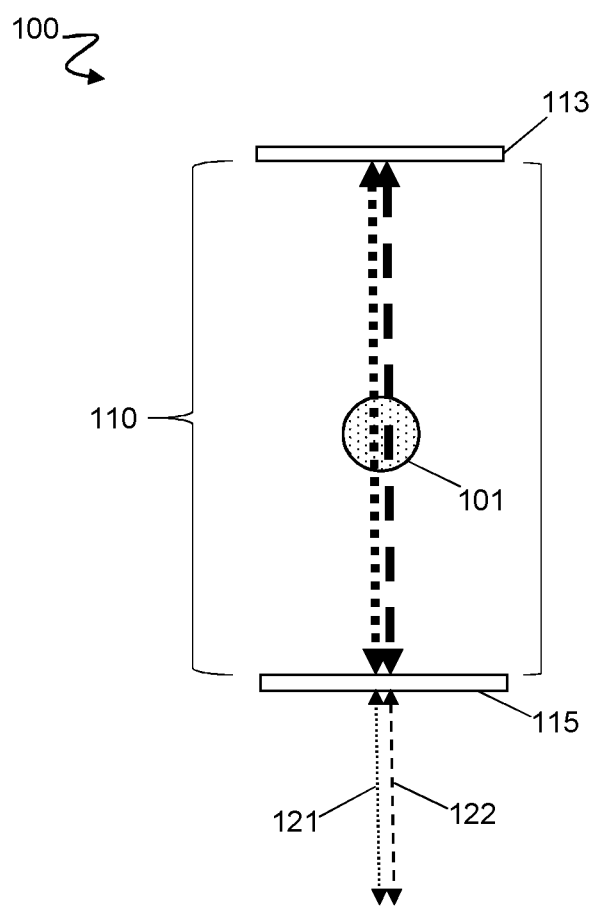
FIG. 1 illustrates an example arrangement of apparatus for providing an atom interferometer with an optical cavity, when in use.

A recently proposed arrangement for an atom interferometer includes placing the atom cloud inside a resonant optical cavity. In this proposed arrangement for an atom interferometer, as illustrated in the FIG. 1 when in use, the apparatus 100 includes, a source for providing an atom cloud 101 arranged inside an optical cavity 110 in use. The optical cavity 110 includes a first mirror 113 having a fully mirrored surface, and a second opposing mirror 115 having a highly reflective surface with some small transmissivity to admit the laser beams. The first mirror 113 and second mirror 115 are configured to have a cavity length L corresponding to an integer number of half wavelengths corresponding to the hyperfine splitting of the relevant energy level in the Bragg or Raman transition to be used to drive the momentum transfer giving rise to the two matter wave arms of the atom interferometer. In this way, a first laser beam 111 and a second coaxially aligned laser beam 112, injected into the cavity in use through second mirror 115, and having different frequencies corresponding to the interactions for the Bragg or Raman transition, will both be on resonance in the cavity, such that they both undergo power enhancement and spatial filtering of their wavefronts inside the cavity.

Using an optical cavity in an atom interferometer in this way would provide many advantages over standard atom interferometry techniques, such as providing resonant enhancement of laser intensities in the cavity, allowing large populations of photon interactions to be achieved with relatively low power milliwatt lasers, compared to the ~1 Watt or greater power lasers needed in non-cavity arrangements. Further, an optical cavity can provide spatial filtering of the wavefront phase and intensity of the laser light needed for the photon interactions, improving the contrast in the resulting measurements, and reducing noise, improving accuracy and sensitivity. Further, the use of an optical cavity would allow effective measurement of the physical phenomena to be performed in a smaller area.

However, use of an optical cavity has been found in practice to be of limited benefit. One reason is that, atoms moving along the length of the cavity, for example in freefall in a gravitational sensing experiment, observe a shift in the frequency of the illuminating laser light caused by the Doppler effect of their motion relative to the light in the cavity. In free space atom interferometers (i.e. without a cavity) compensating for this to keep driving the Bragg or Raman transitions is a relatively simple matter, but for a cavity enhanced atom interferometer, changing the laser frequencies will bring them off resonance with the cavity. Thus this Doppler shift means that it is not possible to adjust the laser frequencies to keep multiple laser frequencies resonant with the cavity simultaneously. In practice, a relatively low finesse cavity would need to be used to accommodate the shift in laser frequencies needed to match the doppler shift, or the measurement time needs to be limited to the period in which the laser frequencies are on resonance with the cavity, which erodes much of the advantage of using a cavity as it results in lower power and lower sensitivity.

Figure 2A:
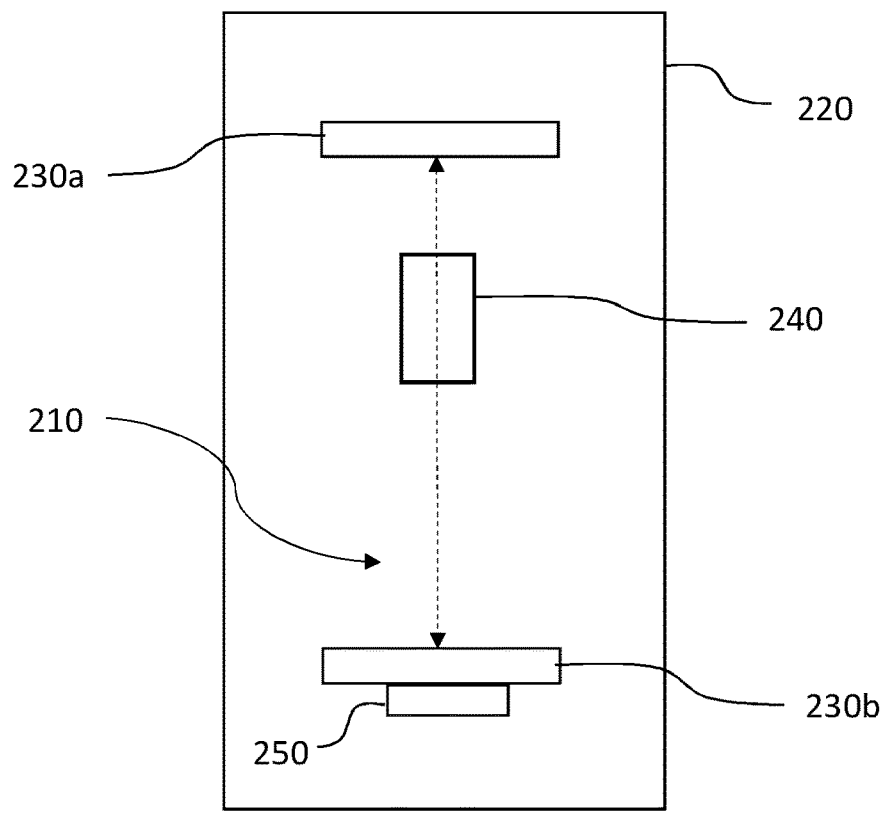
FIGS. 2a and 2b illustrate first and second possible configurations for the vacuum chamber and optical cavity according to embodiments of an atom interferometer in accordance with present invention when in use.
Figure 2B:
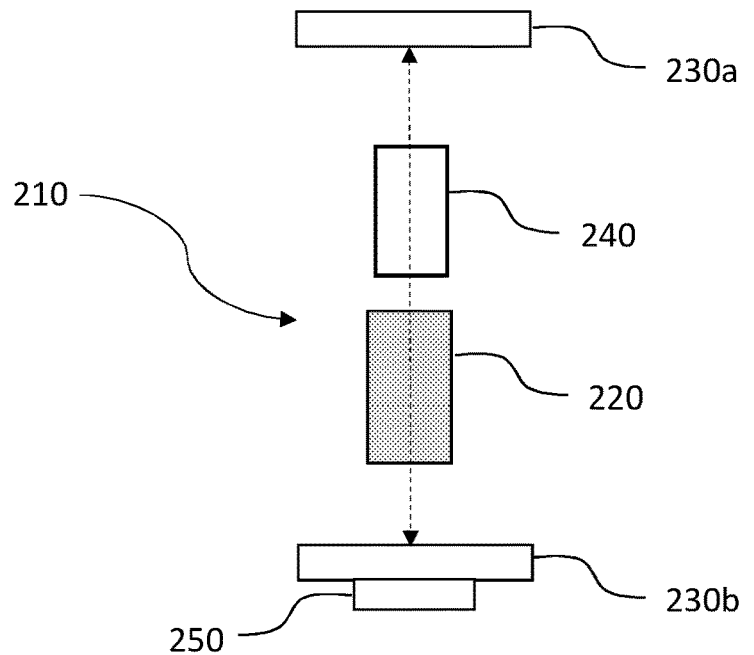

Nevertheless, as can be seen from FIGS. 2a and 2b, embodiments of the present disclosure provide an atom interferometer comprising a vacuum chamber 220, an optical cavity 210, a source (not shown) for providing a cloud of atoms, and one or more light sources (not shown) for exciting the atom cloud to provide momentum transfer to form an atom interferometer in the cavity.

FIG. 2a shows an embodiment whereby the optical cavity 210 is contained within a vacuum chamber 220. The optical cavity 210 comprises cavity mirrors, 230a and 230b, between which an atom cloud 201 is provided by the source (not shown), when in use. The mirrors 213, 215 are highly reflective and may be of any suitable geometry such as plano-convex so as to allow a standing wave beam to stably formed inside the cavity. The mirrors 230a, 230b serve to exclude light repeatedly traversing the cavity 210 that does not have a whole number of half wavelengths fitting into the cavity length so as to form a standing wave therein.

FIG. 2b shows another embodiment in which the vacuum chamber 220 is located inside the cavity 210. In this embodiment, the atom cloud (not shown) provided by a source is located within the vacuum chamber, with light entering and exiting the vacuum chamber through windows therein.

In both the FIG. 2a and FIG. 2b embodiments, an electro-optic element 240 is arranged in the cavity. In use, the one or more light sources provide to the cavity 210 a first light beam 211 having a first polarisation, and at a first frequency for a two-photon interaction in the atoms. The light sources also generate a counterpropagating second light beam 212 having a second polarisation orthogonal to the first polarisation and at a second frequency for the two-photon interaction in the atoms. Here it should be noted that, due to the optical cavity reflecting the light, both beams 211 and 212 (i.e. the beams having two different frequencies) actually travel in both directions. However, in the two-photon interactions, the two beams that participate are counterpropagating, in that they are traveling in opposite directions. The electro-optic element 240 is operable to simultaneously change: the resonant frequency of the cavity 210 for light in the first polarisation to track changes in the frequency of the first light beam 211 to compensate for the doppler shift of the falling atoms in use; and the resonant frequency of the cavity 210 for light in the second polarisation to track changes in frequency of the counterpropagating second light beam 212 to compensate for the doppler shift of the falling atoms in use. In this way, the shifted beam frequencies compensating for the doppler effect of the moving atoms are allowed to simultaneously remain on resonance in the cavity 210.

Advantageously, this allows the resonant frequencies of two orthogonally polarised laser beams within an optical cavity to be arbitrarily controlled over short time scales of less than one second. The resonant frequencies can be adjusted in real time. The relative frequencies of the two laser beams can be adjusted arbitrarily over microsecond time scales and the overall frequencies of each laser beam can be adjusted deterministically over millisecond time scales. The deterministic adjustment is required for interferometry applications.

In this way, resonant enhancement is achieved that can allow atom interferometry to operate in use using a high finesse cavity to deliver a high signal to noise ratio with lower power lasers and resultingly smaller apparatus sizes. In addition the length of the cavity is allowed to be longer, enabling operation and sensitivity over longer time periods, giving increased phase and therefore less overall uncertainty due to greater populations of the atoms arriving in the different end states. The length of the optical cavity 210 may be greater than 80 cm and have a finesse of at least 50. The power of the one or both light sources may be less than 500 µm.

Further, the use of the electro-optic modulator removes the need for the cavity free spectral range to be an integer factor of the hyperfine splitting, as the differences can be compensated with an applied voltage.

The electro-optic element 240 provided within the optical cavity 210 may be a Pockels cell.

The light beams 211, 212 are illustrated by double-headed arrows that show the paths travelled by upward-going and downward-going light beams travelling in the optical cavity. The upward-going and downward-going light beams are each provided by a light source. The light sources are configured to generate light in the upward-going and downward-going light beams at frequencies needed to stimulate Raman or Bragg transitions in the atoms in the atom cloud. One or each of the light sources may be diode lasers.

The electro-optic element 240 may be arranged to differentially change a refractive index in the electro-optic element 240 for each of the light beams when an electric field is applied across the element. Furthermore, the electro-optic element 240 may be aligned in the optical cavity to change the refractive index for the first light beam differentially of the refractive index for the second light beam, thereby simultaneously compensating for doppler shift due to drifting atoms for light beam travelling in both directions. If the electro-optic element 240 is a Pockels cell, the change in the refractive index may be proportional to the change in the applied electric field.

The Pockels cell is placed in the cavity such that the two polarisations of the cavity modes are aligned with the polarisation axis of the Pockels cell. This is known as a phase modulator configuration.

A piezoelectric transducer 250 may be provided on one of the cavity mirrors 230b to act to vary the cavity length on the order of one wavelength of the light or greater, and so the resonant frequencies of both cavity modes may move by the same amount in the same direction. Furthermore, the piezoelectric transducer may be arranged to move a mirror of the optical cavity to adjust the bulk optical path length of the cavity. The piezoelectric transducer 250 is not limited to being provided on mirror 230b.

A voltage source 260, which may be operated by a controller 270, may be coupled to the electro-optic element 240 to generate an electric field in the electro-optic element 240 to change the refractive index of the electro-optic element. The controller 270 is configured to cause the voltage source 260 to applying a voltage to the electro-optic element 240 to cause the resonant frequencies of the two cavity modes to change in opposite directions in order to compensate for the Doppler shift of the frequency of the light beams. In this way, as the frequencies of the light beams 211, 212 are varied to compensate for the doppler shift, the resonant frequencies in the cavity are changed such that the light beams both simultaneously stay on resonance in the cavity 210, driving the Bragg or Raman interactions in the atoms of the atom cloud 201. The controller 270 for controlling the voltage source 260 may be configured to apply a linear ramp to the voltage applied to the electro-optic element 240, to compensate for the frequencies of the laser beams 211, 212 as they are oppositely changed to compensate for the increasing velocity of the atom cloud 201 under freefall.

The atom interferometer may further comprise a magneto-optic apparatus for generating a magneto-optic trap or optical lattice for cooling the atoms in the optical cavity 210, before they are released to form the atom cloud 201 for the experiment. In this way, the magneto-optic trap or optical lattice may provide the atom source.

None of the aforementioned components are limited to either the embodiment of FIG. 2a or the embodiment of FIG. 2b. Accordingly, all of the aforementioned features may be incorporated into the configuration of FIG. 2a or the configuration of FIG. 2b.

Figure 3A:
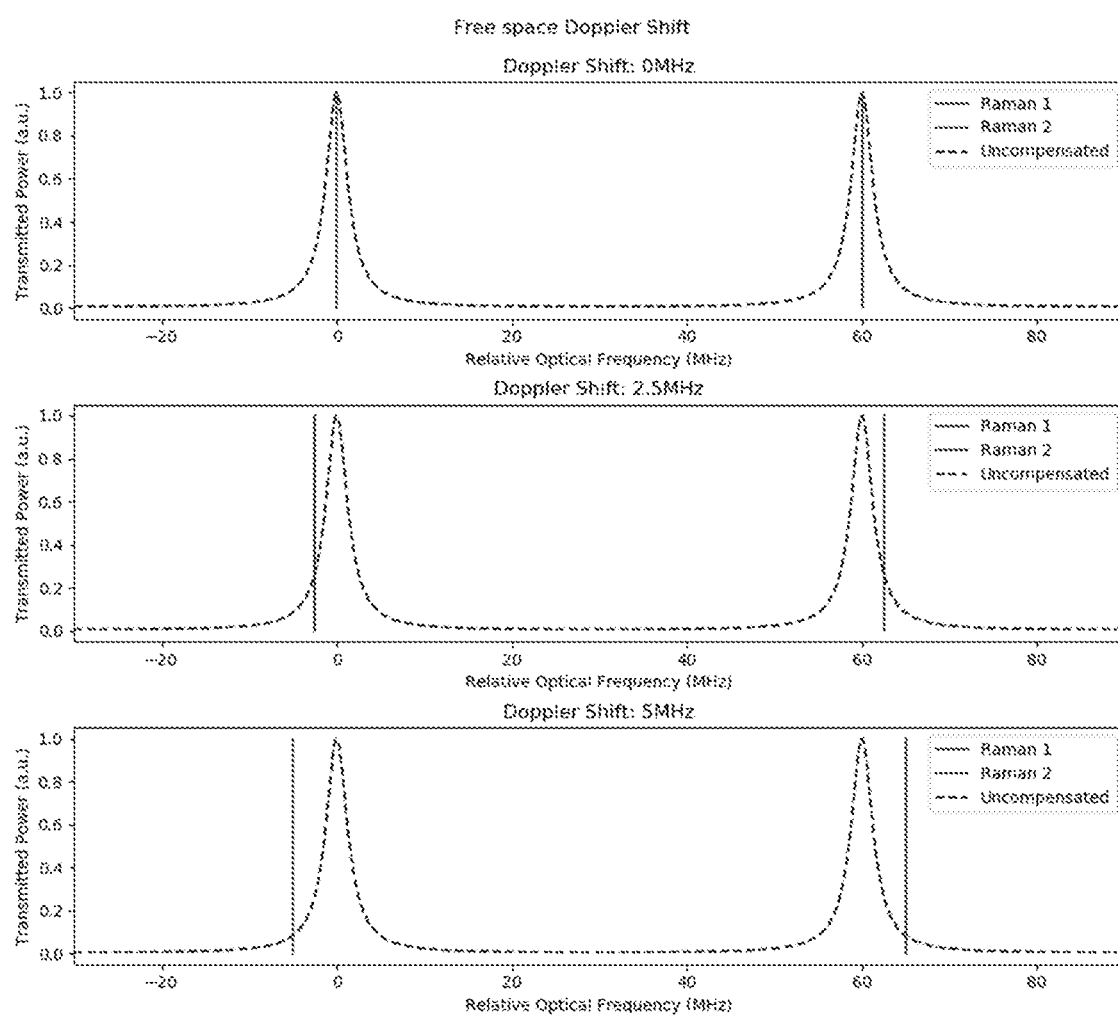
FIGS. 3a, 3b and 3c illustrate the effects of compensating for the Doppler shift in an optical cavity using an atom interferometer according to embodiments of the present invention.
Figure 3B:
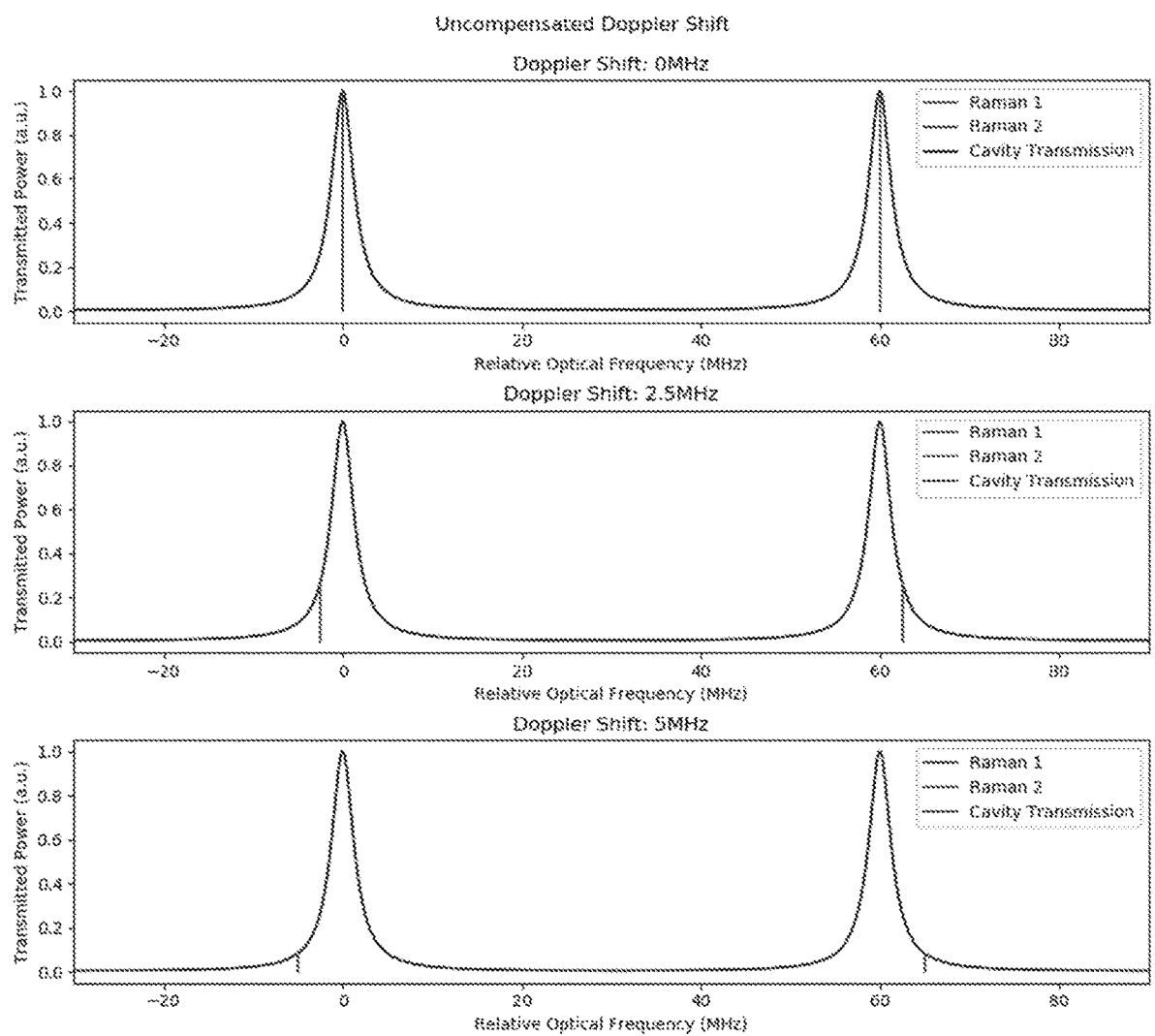
Figure 3C:
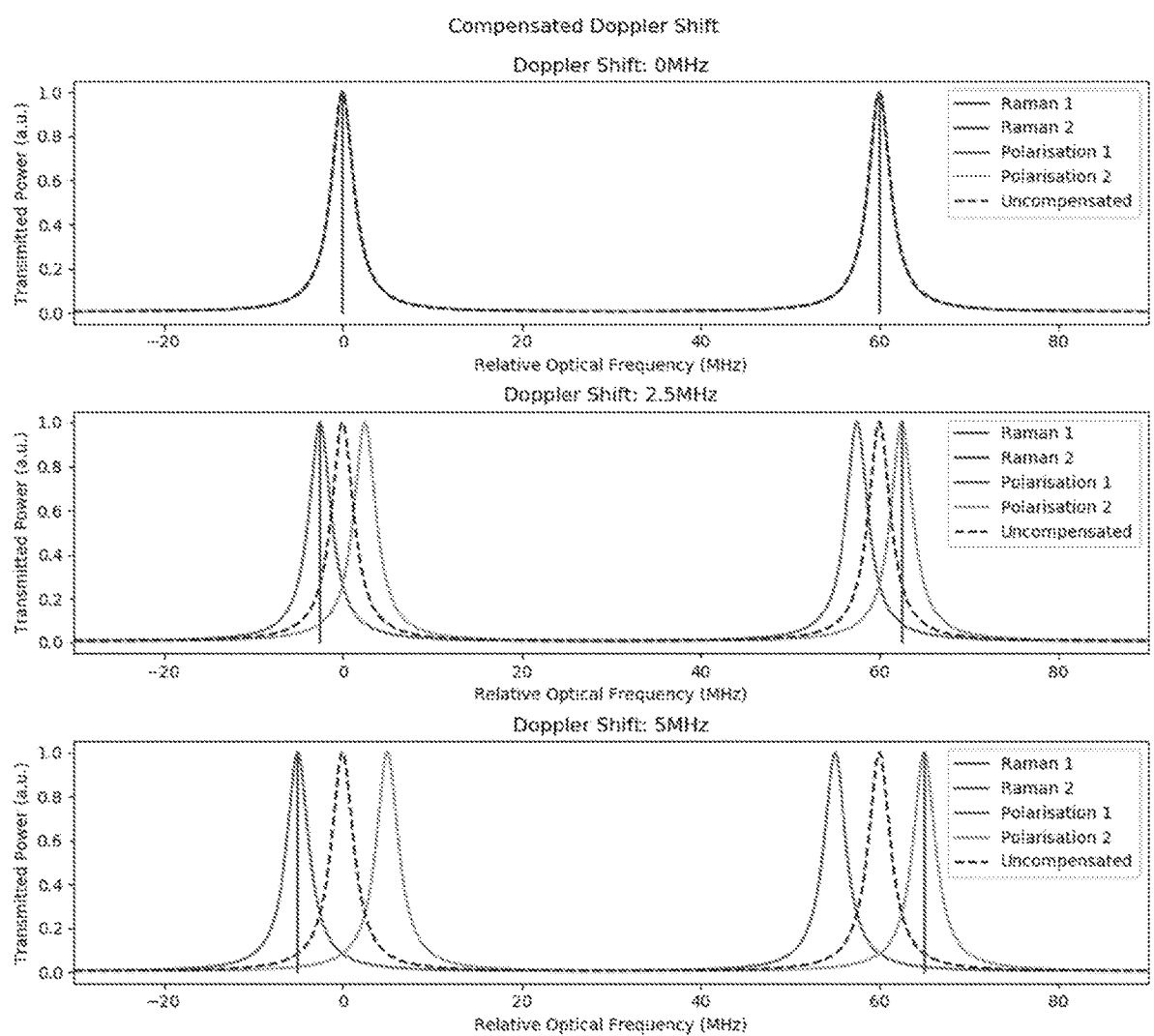

FIGS. 3a to 3c illustrate the improvements made to the transmitted amplitudes of two lasers when a Pockels cell is used as the electro-optic modulator in an optical cavity of an atom interferometer in accordance with an embodiment of the present invention.

The finesse of the optical cavity illustrated in these graphs is 20, which has been selected to make the graphs of FIG. 3b clearer. The length of the optical cavity in the atom interferometer used to obtain these graphs is 5 m. This ensures that the full free spectral range can be observed, along with the Doppler shift. The values used for the finesse and cavity length in the atom interferometer used to obtain the results of FIGS. 3a to 3c are only exemplary, and other values could have been chosen. In practice, providing higher finesse cavities, shorter in length, is possible in accordance with the claimed invention, and will provide further resonant enhancement of the atom interferometer.

FIG. 3a shows how the laser frequencies have to be varied in an atom interferometer with an optical cavity, when a Pockels cell is not present, in order to compensate for the Doppler shift. Raman 1 corresponds to a laser with an upward going beam and Raman 2 corresponds to a laser with a downward going beam. However, the order of these beams could be reversed with a corresponding change in the frequency chirp direction.

For clarity, the Doppler shift shown in this plot is the shift applied to just one of the two laser beams. However, both beams are shifted by this amount in opposite directions.

As can be seen in FIG. 3a, as the Doppler shift increases, the amount that the laser frequencies have to be varied to compensate for the Doppler shift also increases. The transmission spectra for an uncompensated optical cavity are provided for comparison purposes. An uncompensated optical cavity is an optical cavity which does not have an electro-optic element arranged to adjust the refractive index of the element for each beam.

FIG. 3b shows how the intensity of the two laser beams Raman 1 and Raman 2 decreases when the frequencies of the beams moves off resonance with an uncompensated optical cavity. As the Doppler shift increases, so does the reduction in circulating intensity of the laser beams. As can be seen, for an optical cavity with finesse of 20, even for a moderate doppler shift of only 2.5 MHz, the transmitted power within the cavity is dropped to around 25% of the peak, and by a 5 Mz doppler shift, the laser beams have completely fallen off resonance and signal will be unreadable. Without compensation to maintain circulating intensity of the frequency-shifted beams in the cavity, this reduction in laser intensity greatly reduces the performance of the atom interferometer. Moreover, without compensation it then becomes necessary to use a lower finesse cavity, reducing the benefit of providing a cavity, or very short interrogation times to try to lessen the Doppler shift to ensure that the beams remain at least partially on resonance with the modes of the optical cavity.

FIG. 3c shows the transmitted amplitudes of the laser beams when the optical cavity is compensated using an electro-optic element such as a Pockels cell, according to an embodiment of the invention. As a voltage is applied to the Pockels cell, a frequency difference arises between the two polarisations. In FIG. 3c, Polarisation 1 corresponds to Raman 1 and Polarisation 2 corresponds to Raman 2. The spectrum for an uncompensated optical cavity is also shown for comparison purposes.

As the voltage is increased, the frequency difference between the two polarisations increases. The frequencies of each beam change in equal and opposite directions. If the voltage applied to the Pockels cell is increased at the correct rate, the cavity modes can precisely track the laser frequencies to compensate for the Doppler shift. In this way, the intensities of the two laser beams remain constant and maximised, and so the precision of the atom interferometer also remains constant. Furthermore, higher finesse cavities can be used for arbitrarily long times without the beams moving out of resonance. Further still, by keeping the light beams on resonance in the cavity using the EOM, the system becomes insensitive to perturbations in length or frequency.

Figure 4:
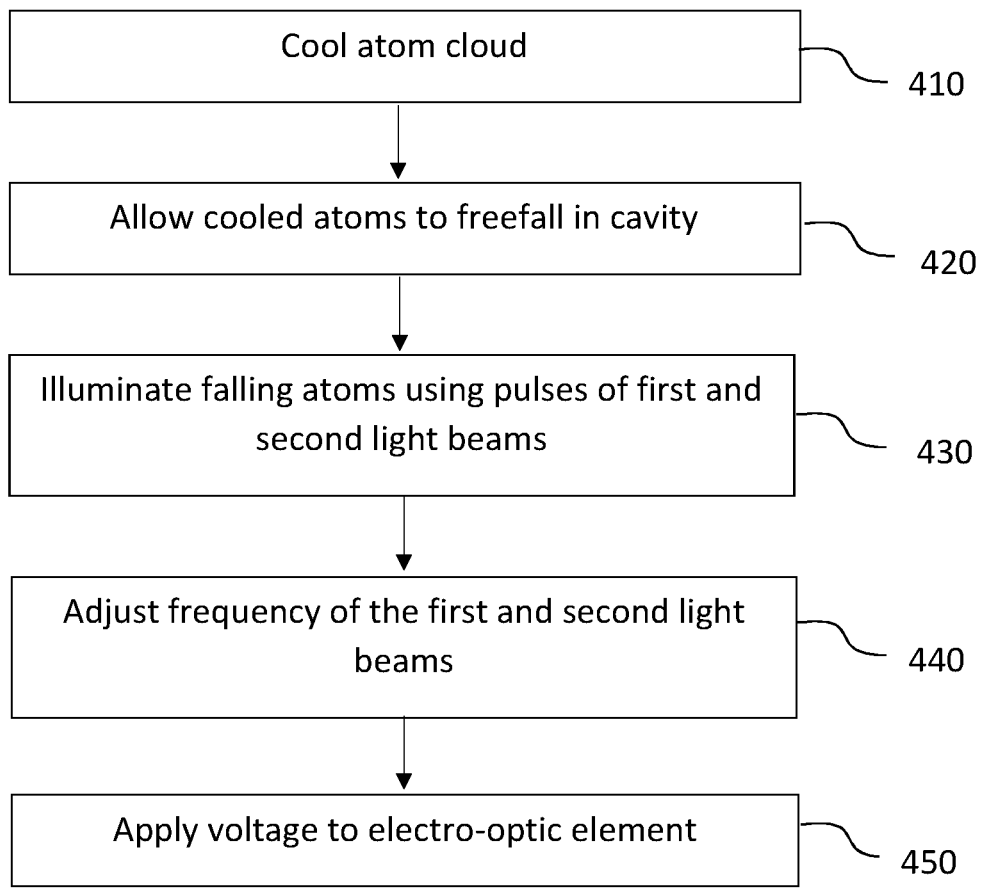
FIG. 4 provides a method for operating an atom interferometer according to an embodiment of the present invention.

FIG. 4 illustrates a method of operating an atom interferometer according to an embodiment of the invention.

The method comprises cooling 410 an atom cloud 201 formed in an optical cavity 210, and allowing 420 the cooled atoms to freefall in the cavity 210. The method further comprises illuminating 430 the falling atoms using pulses of first and second counterpropagating light beams 211, 212. This simulates the falling atoms into a superposition of quantum states of two-photon interactions.

The method further comprises adjusting 440 simultaneously the frequency of the first and second counterpropagating light beams 211, 212 to compensate for the Doppler shift of the light as the atoms fall in the optical cavity 210. The method additionally comprises applying 450 a voltage to the electro-optic element 240 to differentially adjust the optical path length of the cavity 210 for the two propagating light beams 211, 212. This ensures that the optical cavity 210 remains on resonance for both light beams 211, 212 as the frequency of the light beams changes.

The above embodiments have been described by way of example only, and the described embodiments are to be considered in all respects only as illustrative and not restrictive. It will be appreciated that variations of the described embodiments may be made without departing from the scope of the invention which is indicated by the appended claims rather than by the foregoing description. Indeed, although in the embodiments described above, the frequencies of the light beams in the cavity are changed to compensate for doppler shift of the falling atoms, the frequencies can be changed arbitrarily, for reasons other than tracking doppler shifts. For example, other shifts may be compensated for. The electro-optic element may then be used to keep both frequencies on resonance as they are changed.

The invention claimed is:

1. An atom interferometer comprising
a vacuum chamber;
an optical cavity;
a source for providing a cloud of atoms in the optical cavity in use;
one or more light sources for generating, in the cavity, in use:
  a first light beam having a first polarisation and at a first frequency for a two-photon interaction in the atoms;
  a counterpropagating second light beam having a second polarisation orthogonal to the first polarisation and at a second frequency for the two-photon interaction in the atoms;
an electro-optic element arranged in the cavity to be operable to simultaneously change:
  the resonant frequency of the cavity for light in the first polarisation to track changes in the frequency of the first light beam; and
  the resonant frequency of the cavity for light in the second polarisation to track changes in frequency of the counterpropagating second light beam to compensate for the doppler shift of the falling atoms in use.

2. An atom interferometer as claimed in claim 1, wherein the electro-optic element is operable to simultaneously change the resonant frequency of the cavity for light in the first and second polarisations to track changes in the frequency of the first and second light beams to compensate for the doppler shift of the falling atoms in use.

3. An atom interferometer as claimed in claim 1, wherein the vacuum chamber is located inside the optical cavity, or wherein the optical cavity is located inside the vacuum chamber.

4. An atom interferometer as claimed in claim 1, wherein the electro-optic element is arranged to differentially change the refractive index in the element for the first light beam and the second light beam in response to an electric field applied across the element.

5. An atom interferometer as claimed in claim 4, wherein the electro-optic element is a pockels cell, in which the refractive index change is proportional to the change in the applied electric field.

6. An atom interferometer as claimed in claim 4, wherein the electro-optic element is aligned in the optical cavity to change the refractive index for the first light beam in the element differentially to the refractive index for the second light beam in the element.

7. An atom interferometer as claimed in claim 1, further comprising a controller configured to be operable to change the frequency of the first and second counterpropagating light beams to compensate for the doppler shift of the frequency of the light as observed by the atoms as their velocity changes in the cavity to maintain the two-photon interaction in use.

8. An atom interferometer as claimed in claim 1, further comprising a controller configured to be operable to change the optical path length of the cavity for the first and second counterpropagating light beams to maintain cavity resonance for the changed frequencies of both the first and second counterpropagating light beams in the cavity.

9. An atom interferometer as claimed in claim 7, wherein the controller is configured to cause the electro-optic element to change the resonant frequency of the cavity for the first and second counterpropagating light beams in opposite directions.

10. An atom interferometer as claimed in claim 1, further comprising a controller for controlling a voltage source to generate an electric field in the electro-optic element to change the refractive index therein.

11. An atom interferometer as claimed in claim 10, wherein the controller for controlling the voltage source is configured to apply a linear ramp to the voltage applied to the electro-optic element.

12. An atom interferometer as claimed in claim 1, further comprising a control apparatus to control the one or more light sources to pulse the first and second light beams to generate atom momentum recoils from the two-photon interactions to sequentially split, redirect and interfere matter waves to perform atom interferometry in use.

13. An atom interferometer as claimed in claim 1, wherein the atom interferometer is arranged to be useable to measure one or more of gravitational acceleration, gravity gradients, accelerations, rotations, fundamental constants, gravitational constant or the fine structure constant.

14. An atom interferometer as claimed in claim 1, wherein the cavity has a finesse of at least 50.

15. An atom interferometer as claimed in claim 1, wherein the one or more light sources are configured to generate light in the first and second light beams at frequencies needed to stimulate Raman or Bragg transitions for the atoms.

16. An atom interferometer as claimed in claim 1, further comprising a magneto-optic apparatus for generating a magneto-optic trap or optical lattice for cooling the atoms in the optical cavity in use.

17. An atom interferometer as claimed in claim 1, further comprising a piezoelectric transducer arranged to move a mirror of the optical cavity to adjust the optical path length of the cavity.

18. An atom interferometer as claimed in claim 1, wherein the length of the optical cavity is less than 50 cm.

19. An atom interferometer as claimed in claim 1, wherein the power of the first and second light beams is less than 500 mW.

20. An atom interferometer as claimed in claim 1, wherein the each light sources are diode lasers.

21. A method of operating an atom interferometer as claimed in claim 1, the method comprising:
  cooling an atom cloud in the optical cavity;
  allowing the cooled atoms to freefall in the cavity;
  illuminating the falling atoms using pulses of the first and second counterpropagating light beams to stimulate falling atoms into a superposition of quantum states of the two-photon interactions;
  adjusting simultaneously the frequency of the first and second counterpropagating light beams,
  applying a voltage to the electro-optic element to differentially adjust the optical path length of the cavity for the two counterpropagating light beams so that the cavity remains on resonance for both light beams as the frequency of the light beams is changed.

22. A method as claimed in claim 21, wherein adjusting the frequency of the first and second counterpropagating light beams comprises adjusting simultaneously the frequency of the first and second counterpropagating light beams to compensate for the doppler shift of the light as the atoms fall in the cavity.

23. A method as claimed in claim 21, further comprising controlling one or more light sources to pulse the first and second light beams to generate atom momentum recoils from the two-photon interactions to sequentially split, redirect and interfere matter waves to perform atom interferometry.

24. A method as claimed in claim 21, further comprising adjusting the frequency of the first and second counterpropagating light beams and applying a voltage to the electro-optic element to compensate for the doppler shift of the light as the atoms fall in the cavity for a period of at least 55 ms.

25. A method as claimed in claim 21, further comprising using the atom interferometer to measure one or more of phase, gravitational acceleration, gravity gradients, accelerations, rotations, fundamental constants, gravitational constant, the fine structure constant, or inertial effects.

\* \* \* \* \*